US012712302B2

(12) United States Patent
Liu et al.

(10) Patent No.: US 12,712,302 B2
(45) Date of Patent: Aug. 18, 2026

(54) CONDUCTIVE TERMINAL ASSEMBLY AND ELECTRICAL CONNECTOR

(71) Applicant: Tyco Electronics (Shanghai) Co., Ltd., Shanghai (CN)

(72) Inventors: Jiaoyong (Mac) Liu, Shanghai (CN); Hongqiang (Sean) Han, Shanghai (CN); Jie (Roger) Luo, Shunde (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 410 days.

(21) Appl. No.: 18/467,344

(22) Filed: Sep. 14, 2023

(65) Prior Publication Data

US 2024/0088591 A1 Mar. 14, 2024

(30) Foreign Application Priority Data

Sep. 14, 2022 (CN) .......................... 202211118506.3

(51) Int. Cl.

| | |
|---|---|
| ***H01R 13/11*** | (2006.01) |
| ***H01R 13/187*** | (2006.01) |
| ***H01R 25/14*** | (2006.01) |
| ***H01R 25/16*** | (2006.01) |
| *H01R 12/72* | (2011.01) |

(52) U.S. Cl.

CPC ........... *H01R 13/11* (2013.01); *H01R 25/142* (2013.01); *H01R 25/145* (2013.01); *H01R 12/721* (2013.01); *H01R 13/187* (2013.01); *H01R 25/162* (2013.01)

(58) Field of Classification Search

CPC .... H01R 13/11; H01R 25/142; H01R 25/145; H01R 12/721; H01R 13/187; H01R 25/161; H01R 25/162

See application file for complete search history.

(56) References Cited

U.S. PATENT DOCUMENTS

| | | | | |
|---|---|---|---|---|
| 6,645,012 | B2 * | 11/2003 | Ito ........................ | H01R 12/721 439/862 |
| 2022/0131300 | A1 * | 4/2022 | Liu ........................ | H01R 4/489 |
| 2023/0155333 | A1 * | 5/2023 | Keutz .................. | H01R 25/142 439/110 |

* cited by examiner

*Primary Examiner* — Renee S Luebke
*Assistant Examiner* — Paul D Baillargeon
(74) *Attorney, Agent, or Firm* — Barley Snyder

(57) ABSTRACT

A conductive terminal assembly includes at least three layers of conductive terminals. Each layer of conductive terminals has a terminal body, one or more elastic arms extending from the terminal body, and a contact end at an end of each elastic arm distal from the terminal body in a first direction. The terminal bodies of the at least three layers of conductive terminals are overlapped with each other in a second direction perpendicular to the first direction. The contact ends of the at least three layers of conductive terminals are at least partially staggered and arranged in a third direction perpendicular to the first direction and the second direction. The contact ends are capable of electrically contacting a mating component.

21 Claims, 10 Drawing Sheets

CONDUCTIVE TERMINAL ASSEMBLY AND ELECTRICAL CONNECTOR

CROSS-REFERENCE TO RELATED APPLICATION

This application claims the benefit of the filing date under 35 U.S.C. § 119(a)-(d) of Chinese Patent Application No. 202211118506.3, filed on Sep. 14, 2022.

FIELD OF THE INVENTION

Embodiments of the present disclosure generally relate to the field of connectors, and more specifically, to a conductive terminal assembly and an electrical connector with improved current-carrying effect.

BACKGROUND

An electrical connector generally includes a conductive terminal installed in an insulation housing and configured to contact or clamp a mating component to provide electrical connection. In conventional technologies, the conductive terminal is usually designed in a single-layer or double-layer structure to form a single or two electrical contact points with the mating component. However, in actual applications, as the current to be transmitted increases, there is a need for the conductive terminal of the connector to carry higher current. For the existing conductive terminals in a single-layer, though, there is not only a defect of low current path density, but also a large force for plugging in or out. The existing conductive terminals with double-layer structure can no longer meet the requirements of such a large current-carrying capacity, and the terminals with double-layer structure occupy a large transverse space. Therefore, there is a demand for conductive terminals that can achieve higher current transmission capacity in the same limited space.

SUMMARY

A conductive terminal assembly includes at least three layers of conductive terminals. Each layer of conductive terminals has a terminal body, one or more elastic arms extending from the terminal body, and a contact end at an end of each elastic arm distal from the terminal body in a first direction. The terminal bodies of the at least three layers of conductive terminals are overlapped with each other in a second direction perpendicular to the first direction. The contact ends of the at least three layers of conductive terminals are at least partially staggered and arranged in a third direction perpendicular to the first direction and the second direction. The contact ends are capable of electrically contacting a mating component.

BRIEF DESCRIPTION OF THE DRAWINGS

Features and advantages of various embodiments of the present disclosure will become more apparent from the following detailed description taken in conjunction with the accompanying drawings, in which.

DETAILED DESCRIPTION OF THE EMBODIMENTS

Figure 1:
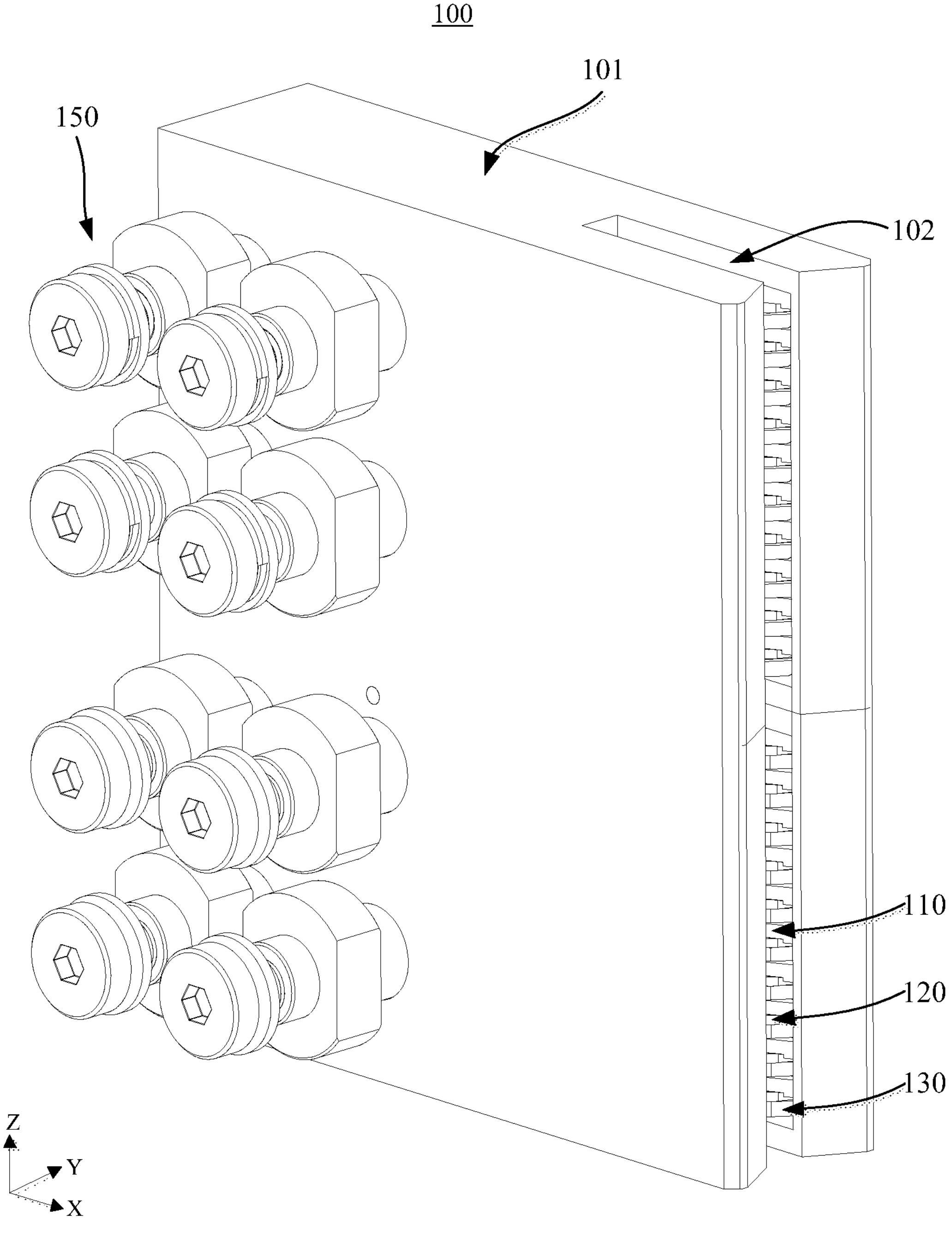
FIG. 1 is a perspective view schematically showing the structure of an electrical connector according to an exemplary embodiment of the present disclosure.

Embodiments of the present disclosure will be described in detail below in conjunction with the accompanying drawings. In this specification, the same or similar components are indicated by the same or similar reference numerals. The following description of the various embodiments of the present disclosure made with reference to the drawings is intended to set forth the general concepts of the present disclosure and should not be construed as a limitation of the present disclosure.

In addition, in the following detailed description, for ease of illustration, many specific details are set forth to provide a comprehensive understanding of the embodiments of the present disclosure. However, one or more of the embodiments may be implemented without these specific details. In other cases, well-known structures and devices are embodied in an illustrative manner so as to simplify the drawings.

As shown in FIGS. 1 to 6, according to the exemplary embodiments of the present disclosure, there is provided a conductive terminal assembly and an electrical connector 100 having such a conductive terminal assembly. The electrical connector 100 has at least three layers of conductive terminals to provide improved current-carrying capacity, so that the electrical connector can be used for high current applications, such as electrical power supply connectors. In the embodiment shown in FIG. 6, the electrical connector 100 may be a bus or bus-bar connector, which is configured to provide a reliable electrical connection between a horizontal bus-bar 10 and a vertical bus-bar 20.

As shown, the electrical connector 100 mainly includes a housing 101 and a conductive terminal assembly installed in the housing 101. For example, the housing 101 may be made of an insulating material such as plastic, and defines a slot 102 which has a centerline extending in a first direction X. A mating component such as a bus-bar is allowed to be at least partially inserted into the slot 102 in the first direction X to electrically contact the conductive terminal assembly installed in the housing 101. The slot 102 has a size suitable for receiving at least a portion (a connection portion or an insertion portion to be described below) of the mating component.

The conductive terminal assembly provided in the exemplary embodiments of the present disclosure includes at least three layers of conductive terminals. Each layer of conductive terminals includes a terminal body and a contact end connected to the terminal body. The contact end is positioned to be at least partially exposed from the slot 102 to make electrical contact with an inserted mating component. This contact may be surface contact, line contact or point contact. Each layer of conductive terminals may also include one or more elastic arms extending from the terminal body. One contact end is provided at an end of each elastic arm distal from the terminal body in the first direction X. For example, the contact end may be formed as a free end portion of the elastic arm. It will be understood that expressions such as "end" and "end portion" used herein are not limited to a tip end or endpoint of a component, but may refer to a section or portion of the component with a certain length or size and including the tip end, unless otherwise expressly stated.

Exemplarily, terminal bodies of the at least three layers of conductive terminals of each conductive terminal assembly are stacked or overlapped in a second direction Y perpendicular to the first direction X, and the contact ends of the at least three layers of conductive terminals are at least partially staggered and arranged in a third direction Z perpendicular to the first direction X and the second direction Y. In some examples, at least two elastic arms of the at least three layers of conductive terminals of each conductive terminal assembly may also be overlapped in the second direction Y. This overlapping and staggered arrangement can provide more contact portions or contact points for electrical contact with the mating component.

For example, the number of at least three layers of conductive terminals may be N, where N is a natural number greater than or equal to 3; each layer of conductive terminals includes M elastic arms extending from the terminal body, where M is a natural number greater than or equal to 1 (e.g., ten or more elastic arms shown in the figures); and each contact end has a contact portion configured to contact the mating component, then each conductive terminal assembly can provide at least N×M contact portions or contact points (or surfaces), so that N×M current transmission paths are established between the conductive terminal assembly and the mating component. Obviously, the arrangement of at least three layers of conductive terminals can significantly improve the current-carrying capacity and reduce the contact impedance, for example, the number of contact points and current transmission paths provided can be increased by at least 50%, compared to a single-layer or double-layer structure of terminal components, so that it can better meet the requirements for high-current applications.

In some embodiments, the contact portions of the N contact ends arranged adjacent to each other in the third direction Z are at least partially located in the same contact surface. In an embodiment, the contact portions of all the contact ends of the at least three layers of conductive terminals are at least partially located in the same contact surface, so that all of the contact ends can establish electrical contact with the mating component which is usually flat plate shaped. It will be understood that, depending on the shape of a mating component to be inserted, the conductive terminal can be arranged so that the contact point or surface defined by the contact portion of the contact end may also be located in the same plane or curved surface, or in different planes. The N contact ends arranged adjacent to each other in the third direction Z may form a contact terminal group. Each contact end of the contact terminal group can contact with each other or be separated from each other, and there may be a gap between the contact terminal groups being arranged adjacent to each other in the third direction Z.

In an exemplary embodiment of the present disclosure, the N contact ends being arranged adjacent to each other in the third direction Z may be arrayed so that the total width of the N contact ends in the third direction Z is less than the sum of the respective widths of the N contact ends in the third direction Z, thereby reducing the total width of respective contact ends in the third direction Z, enabling the contact ends to be arranged more densely in the third direction Z, and further improving the current-carrying capacity of the conductive terminal assembly.

In some embodiments, the adjacent contact ends may be at least partially overlapped in the second direction Y. For example, at least two of the N contact ends being arranged adjacent to each other in the third direction Z may be at least partially overlapped with each other in the second direction Y. As an example, a portion of one contact end forms a contact portion, while the other portions are overlapped with each other in the second direction Y with respect to an adjacent contact end. This can also increase the arrangement density of the contact ends of the conductive terminals in the third direction. In some other examples, at least one of the N contact ends being arranged adjacent to each other in the third direction Z may have a notch or through-hole, so as to allow a contact end adjacent thereto to be at least partially positioned within the notch or through-hole, which may also reduce the total width or occupied space of the respective contact ends in the third direction Z, so that more contact ends can be arranged in the third direction Z.

In some embodiments, the adjacent elastic arms may be staggered and arranged in the second direction Y, and may be also at least partially overlapped with each other. For example, at least two of the N elastic arms being arranged adjacent to each other in the third direction Z may be at least partially overlapped with each other in the second direction Y, thereby increasing the arrangement density of the elastic arms and the contact ends of the conductive terminals in the third direction Z.

The structures of the conductive terminal assembly and of the electrical connector provided in some embodiments of the present disclosure will be described below with reference to the accompanying drawings. In the embodiment shown in FIG. 1 to FIG. 5D, the conductive terminal assembly includes three layers of conductive terminals, including a first layer of conductive terminal 110, a second layer of conductive terminal 120 and a third layer of conductive terminal 130 arranged in sequence in the second direction Y. According to actual application requirements, a terminal assembly having more than three layers of conductive terminals is also feasible, which can further improve the current-carrying capacity.

Illustratively, the first layer of conductive terminal 110 includes a first terminal body 111, a plurality of first elastic arms 112 extending from the first terminal body 111 and spaced apart from each other, and a first contact end 113 located at an end of each first elastic arm 112 distal from the first terminal body 111 in the first direction X. The second layer of conductive terminal 120 includes a second terminal body 121, a plurality of second elastic arms 122 extending from the second terminal body 121 and spaced apart from each other, and a second contact end 123 located at an end of each second elastic arm 122 distal from the second terminal body 121 in the first direction X. Similarly, the third layer of conductive terminal 130 includes a third terminal body 131, a plurality of third elastic arms 132 extending from the third terminal body 131 and spaced apart from each other, and a third contact terminal 133 located at an end of each third elastic arm 132 distal from the third terminal body 131 in the first direction X. Accordingly, the first contact end 113, the second contact end 123, and the third contact end 133 have a first contact portion 116, a second contact portion 126 and a third contact portion 136, respectively, for electrical contact with the mating component inserted or plugged into the electrical connector. There are a first gap 118 between the first elastic arms 112 being adjacent to each other in the third direction Z, a second gap 128 between the second elastic arms 122 being adjacent to each other in the third direction Z, and a third gap 138 between the third elastic arms 132 being adjacent to each other in the third direction Z.

It should be noted that the "terminal body" described herein includes the first terminal body 111, the second terminal body 121 and the third terminal body 131, which are schematically shown in the drawings. The "elastic arm" described herein includes the first elastic arm 112, the second elastic arm 122 and the third elastic arm 122, which are schematically shown in the drawings. The "contact end" described herein includes the first contact end 113, the second contact end 123 and the third contact end 133, which are schematically shown in the drawings. The "contact portion" described herein includes the first contact portion 116, the second contact portion 126 and the third contact portion 136, which are schematically shown in the drawings. The contact portions, such as the first contact portion 116, the second contact portion 126 and the third contact portion 136, may include, define or have parts (e.g., contact points, contact surfaces or the like) for surface contact, line contact, or point contact with the inserted mating component.

In the illustrated embodiments, the first terminal body 111, the second terminal body 121 and the third terminal body 131 of the respective layer of conductive terminals are sequentially overlapped with each other in the second direction Y, for example, from inside to outside. As an example, these terminal bodies may each have a substantially flat plate shape. The first elastic arm 112, the second elastic arm 122 and the third elastic arm 122 of the respective layer of the conductive terminals may be arranged in a one-to-one correspondence relationship. For example, their number is the same, for example ten as shown in the figures, or fifteen, twenty or more.

As shown in FIG. 2 to FIG. 5D, the first contact end 113, the second contact end 123 and the third contact end 133 of the respective layer of conductive terminals are at least partially staggered and arranged in the third direction Z, for electrical contact with the mating component. In the illustrated embodiments, a portion of the first contact end 113 (e.g., the contact portion thereof), a portion of the second contact end 123 (e.g., the contact portion thereof) and all of the third contact end 133 are staggered and arranged adjacent to each other in the third direction Z, so that the arrangement density of the contact ends and thus the corresponding contact points can be improved.

In the embodiments shown in FIG. 3A to FIG. 5D, the first contact end 113 has a notch 114 on a side of the first contact portion 116 in the third direction Z, while an adjacent second contact end 123 has a raised portion 124, which defines the second contact portion 126. The raised portion 124 is at least partially positioned within the notch 114, so that the first contact portion 116 and the second contact portion 126 are at least partially located in the same contact surface. As an example, the notch 114 of the first contact end 113 may be formed in the form of a groove in the third direction Z, which penetrates the first contact end 113 in the second direction. In other examples, a through-hole penetrating the first contact end 113 in the second direction may be formed in the first contact end 113, so as to accommodate the raised portion 124 of the second contact end 123.

The raised portion 124 of the second contact end 123 protrudes beyond the rest of the second contact end 123 in the second direction Y, for example, in the direction for contacting the mating component inserted, for example, forming a substantially V-shaped or U-shaped contour. The raised portion 124 of the second contact end 123 is at least partially positioned in the first gap 118 in the third direction Z, for example, positioned between the first contact end 113 and the third contact end 133 adjacent thereto, so as to be staggered or interlaced with the first contact end 113 and the third contact end 133 adjacent thereto in the third direction Z, and the rest of the second contact end 123 may be at least partially overlapped with the first contact end 113 and/or the third contact end 133 adjacent thereto in the second direction Y.

As shown, a width of the first contact portion 116 in the third direction Z may be less than a width of the rest of the first contact end 113 in the third direction Z, and/or less than a width of the corresponding first elastic arm 112 in the third direction Z. A width of the second contact portion 126 or the raised portion 124 in the third direction Z may be less than a width of the corresponding second elastic arm 122 in the third direction Z, and/or less than the total width of the second contact end 123 in the third direction Z.

As shown in FIGS. 4A to 4C, FIGS. 4F to 5B and FIG. 5D, each of the first elastic arms 112 are at least partially overlapped with the corresponding second elastic arm 122 in the second direction Y, and/or the width of the second elastic arm 122 in the third direction Z is greater than the width of the corresponding first elastic arm 112 in the third direction Z. As an example, in each contact terminal group, the first elastic arm 112 and the second elastic arm 122 may be positioned in the third direction Z at least partially in the third gap 138 between adjacent third elastic arms 132.

In embodiments shown in FIG. 5A to FIG. 5D, each of third elastic arms 132 has a notch or recess 134 on a side of the third contact end 133. The notch or recess 134 may form a portion of the third gap 138, and the corresponding first contact end 113 and second contact end 123 may be at least partially positioned in the notch or recess 134. As shown, the width of each third contact end 133 in the third direction Z may be less than the width in the third direction Z of a portion of the corresponding third elastic arm 132 close to the third terminal body 131. A wider portion of the third elastic arm 132 close to the third terminal body 131 may be at least partially overlapped with the corresponding second elastic arm 122 and/or the first elastic arm 112 in the second direction Y.

In the exemplary embodiments shown in FIGS. 2 to 3B, FIGS. 4A to 4C, and FIGS. 5A and 5B, the electrical connector 100 further includes a support block 140 for supporting and fixing the conductive terminal assembly in the housing 101. The support block 140 may be made of a conductive material, such as a copper block. The conductive terminal assembly mentioned above may be provided on a surface of the support block 140 in the second direction Y. For example, the conductive terminal assembly may be detachably fixed on the surface of the support block 140 via a fastening assembly 150. For example, as shown in FIG. 3A to FIG. 5D, connection holes 117, 127 and 137 are formed in the first terminal body 111, the second terminal body 121 and the third terminal body 131, respectively. Fasteners 107 such as bolts or rivets may be inserted into these connection holes 117, 127 and 137 to fix these terminal bodies with respect to the support block 140.

In some embodiments, at least two conductive terminal assemblies described above that are spaced apart from each other may be provided on two opposite surfaces of the support block 140 in the second direction Y; and/or one or more conductive terminal assemblies described may be provided on at least one of the two opposite surfaces of the support block 140 in the second direction Y, and these conductive terminal assemblies may be arrayed and spaced apart from each other in the third direction Z, that is, the adjacent conductive terminal assemblies are separated or spaced apart from each other in the second and third directions.

Figure 5A:
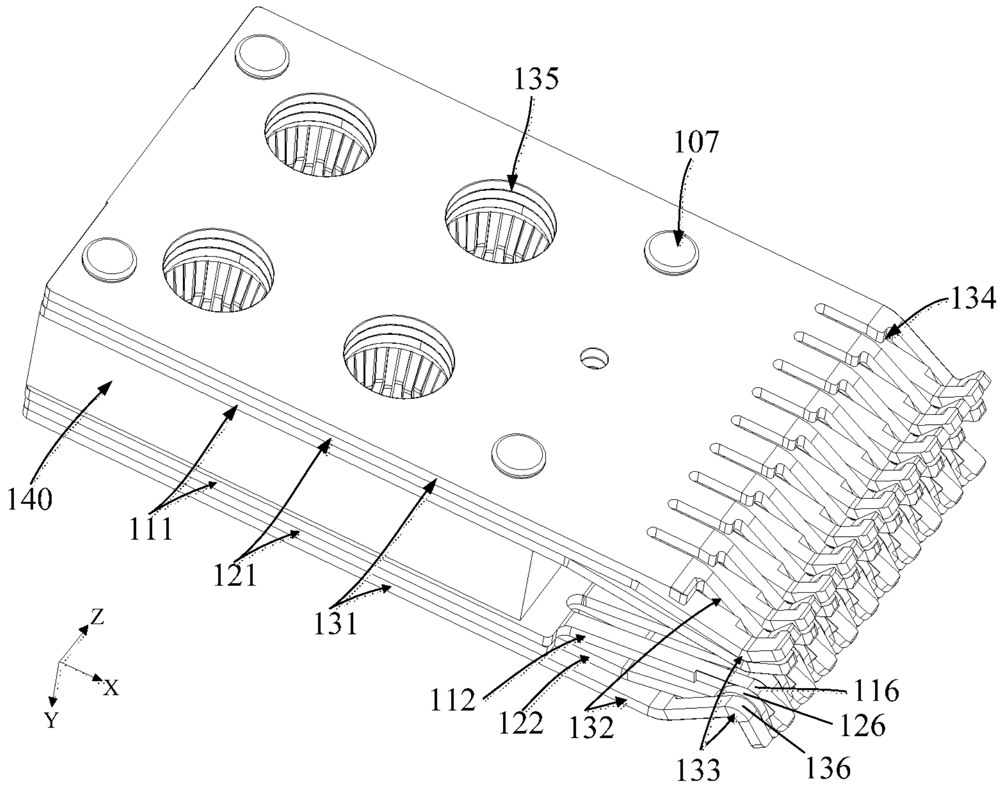
FIG. 5A is a perspective view schematically showing the structure of a part of the electrical connector according to the exemplary embodiment of the present disclosure, in which three layers of conductive terminals are assembled on each of two sides of the support block of the electrical connector, respectively.
Figure 5B:
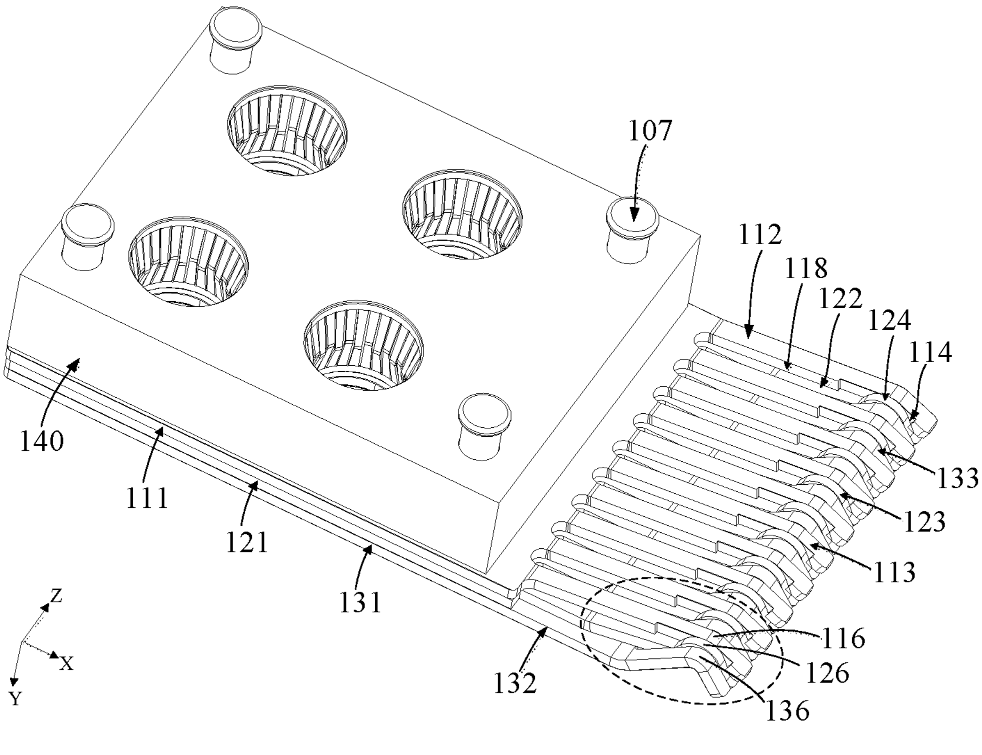
FIG. 5B is a perspective view schematically showing the structure of a part of the electrical connector according to the exemplary embodiment of the present disclosure, in which three layers of conductive terminals are assembled on a side of the support block of the electrical connector.
Figure 5C:
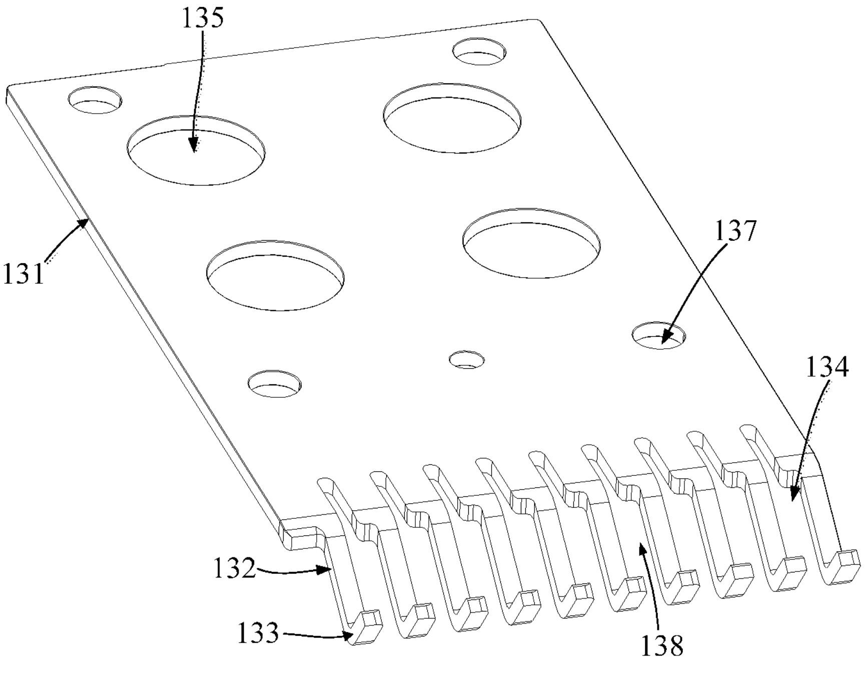
FIG. 5C is a perspective view schematically showing the structure of a third layer of conductive terminal of the electrical connector according to the exemplary embodiment of the present disclosure.
Figure 5D:
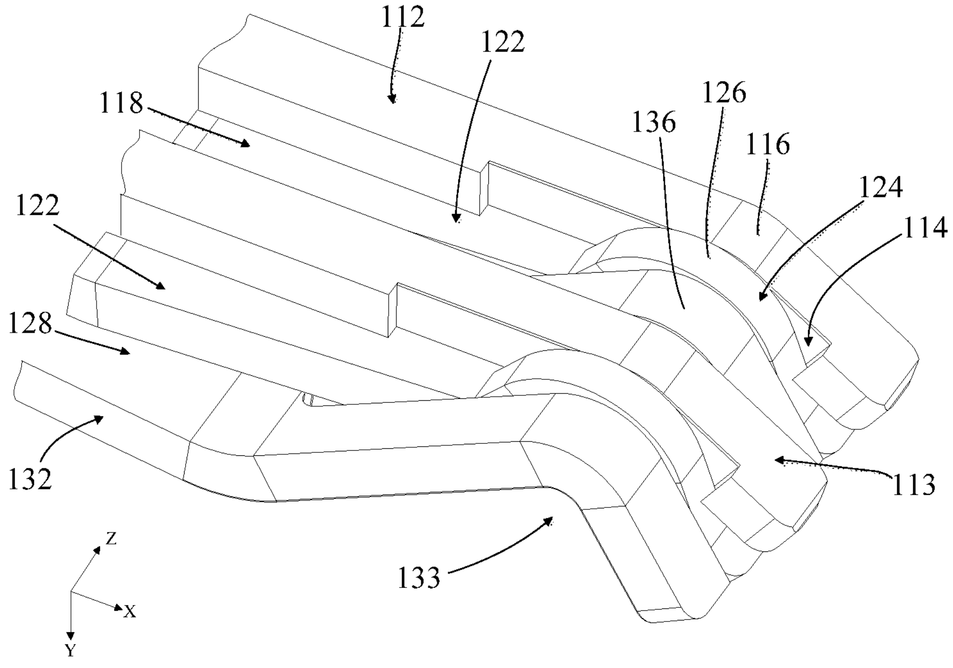
FIG. 5D is a partially enlarged view schematically showing the structure of the dotted circle portion shown in FIG. 5B.

In some examples, as shown in FIG. 5A, in the two conductive terminal assemblies that are spaced apart from each other are provided on two opposite surfaces of the support block 140 in the second direction Y, the contact ends (and elastic arms) of the conductive terminal of one layer in the first to third layers of conductive terminals of one conductive terminal assembly may be respectively aligned in the second direction or may be misaligned in the second direction or offset in the third direction with respect to the corresponding contact ends (and elastic arms) of the conductive terminal of the corresponding layer of the other conductive terminal assembly, so as to enable contacting and clamping the inserted mating component stably and reliably.

Figure 2:
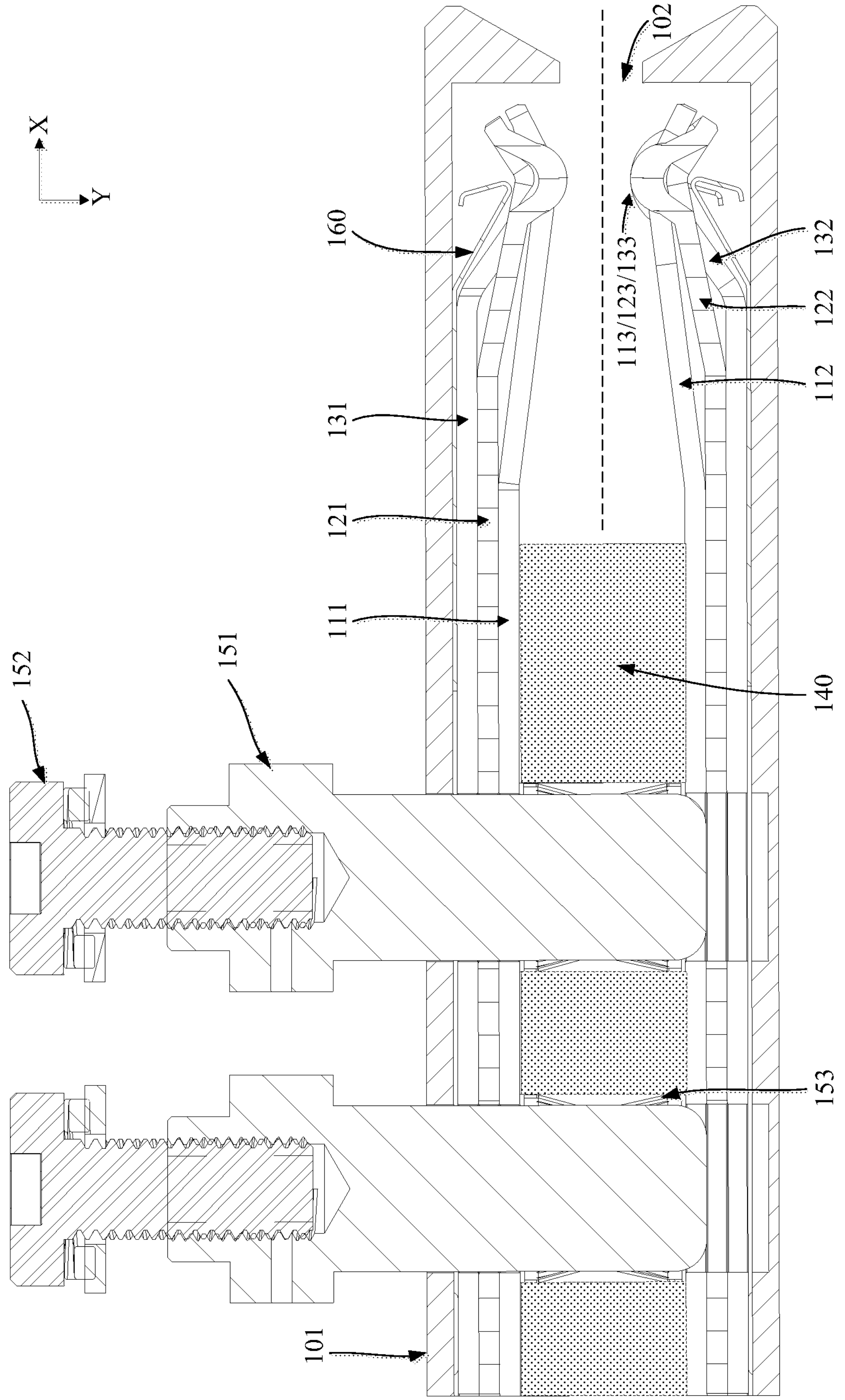
FIG. 2 is a cross-sectional view schematically showing the structure of the electrical connector according to the exemplary embodiment of the present disclosure.
Figure 3A:
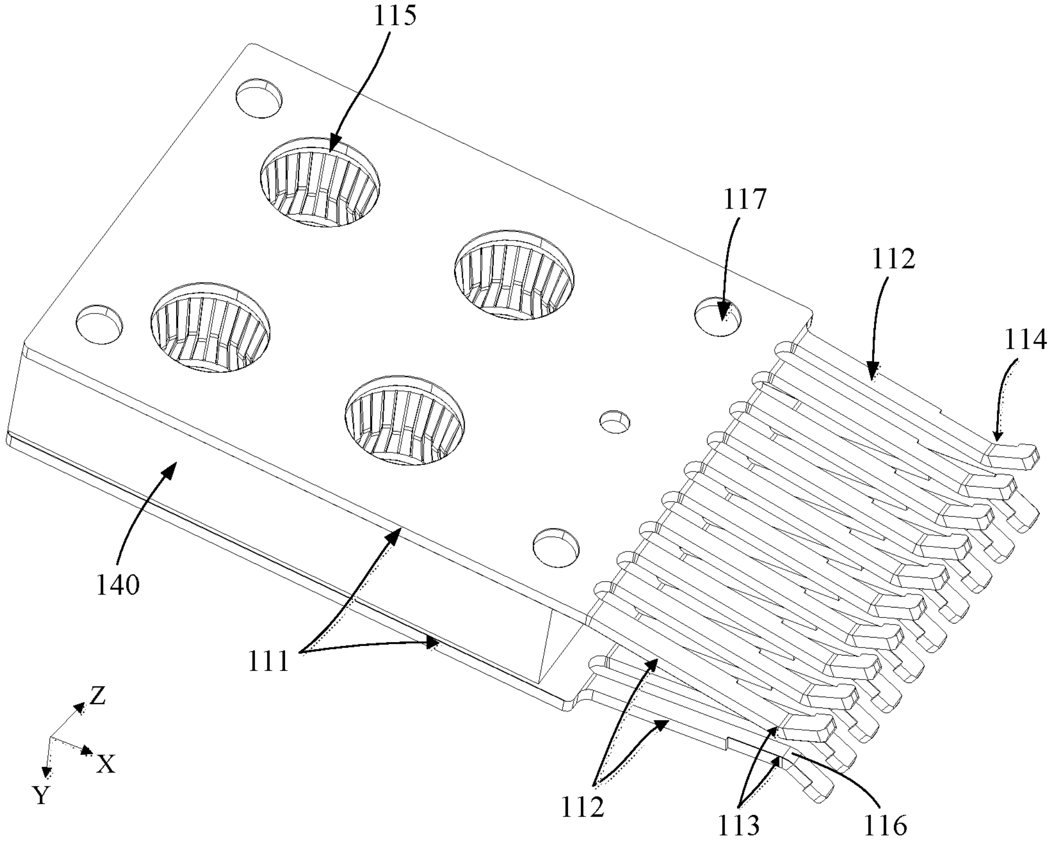
FIG. 3A is a perspective view schematically showing the structure of a part of the electrical connector according to the exemplary embodiment of the present disclosure, in which a layer of conductive terminal is assembled on each of two sides of a support block of the electrical connector, respectively.
Figure 3B:
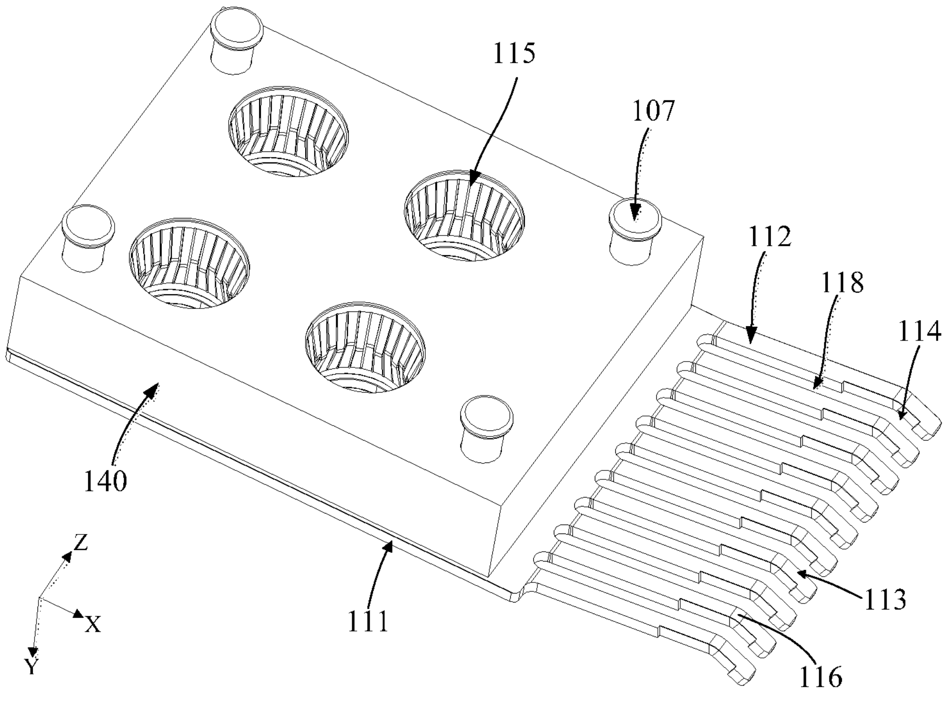
FIG. 3B is a perspective view schematically showing the structure of a part of the electrical connector according to the exemplary embodiment of the present disclosure, in which a layer of conductive terminal is assembled on a side of the support block of the electrical connector.
Figure 3C:
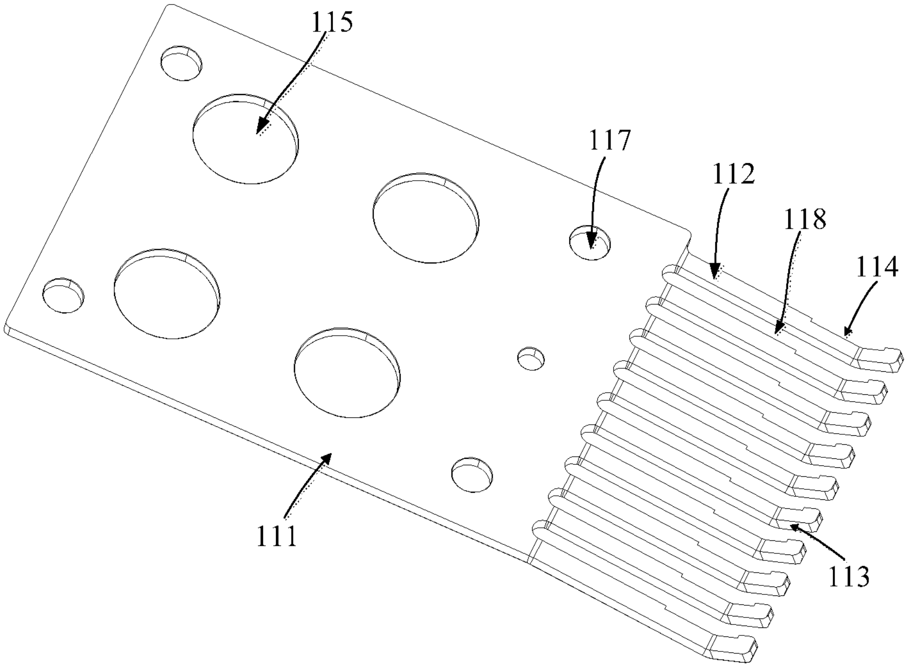
FIG. 3C is a perspective view schematically showing the structure of a first layer of conductive terminal of the electrical connector according to the exemplary embodiment of the present disclosure.
Figure 4A:
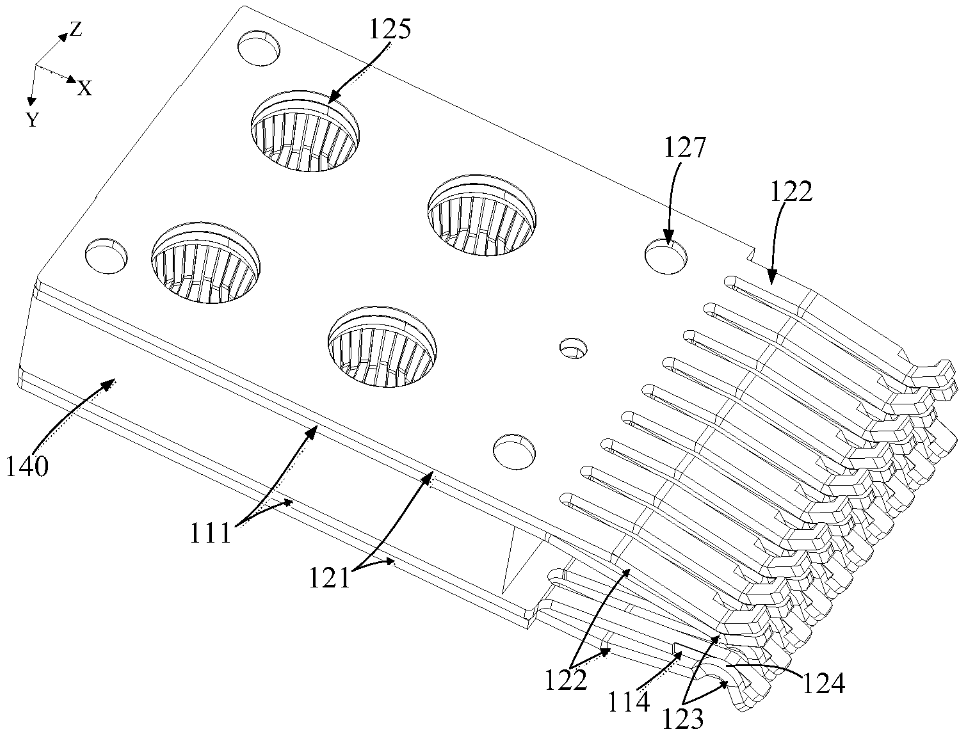
FIG. 4A is a top perspective view schematically showing the structure of a part of the electrical connector according to the exemplary embodiment of the present disclosure, in which two layers of conductive terminals are assembled on each of two sides of the support block of the electrical connector, respectively.
Figure 4B:
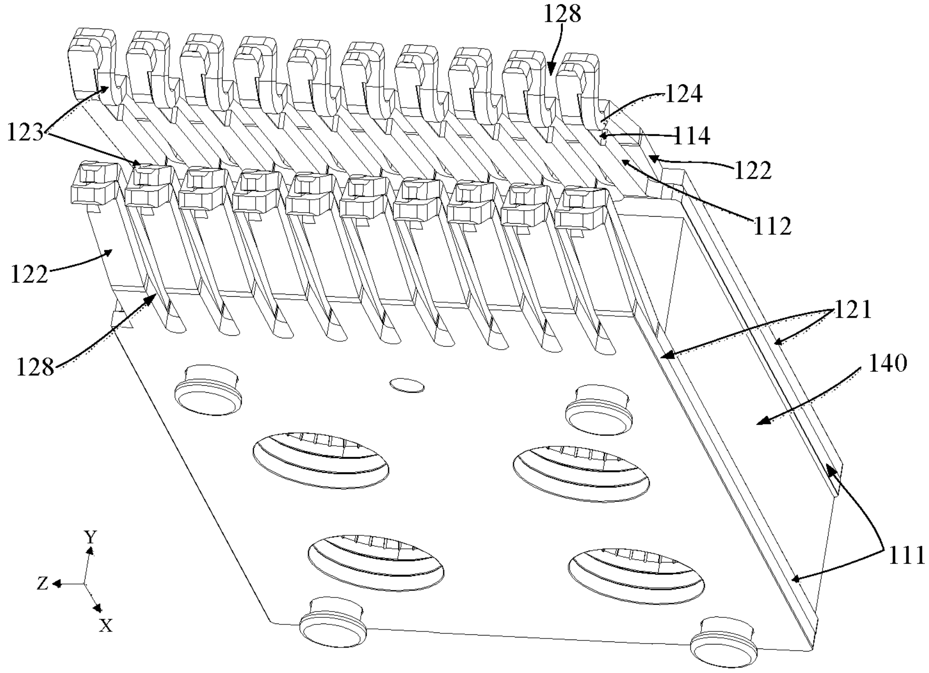
FIG. 4B is a bottom perspective view schematically showing the structure of a part of the electrical connector according to the exemplary embodiment of the present disclosure, in which two layers of conductive terminals are assembled on each of two sides of the support block of the electrical connector, respectively.
Figure 4C:
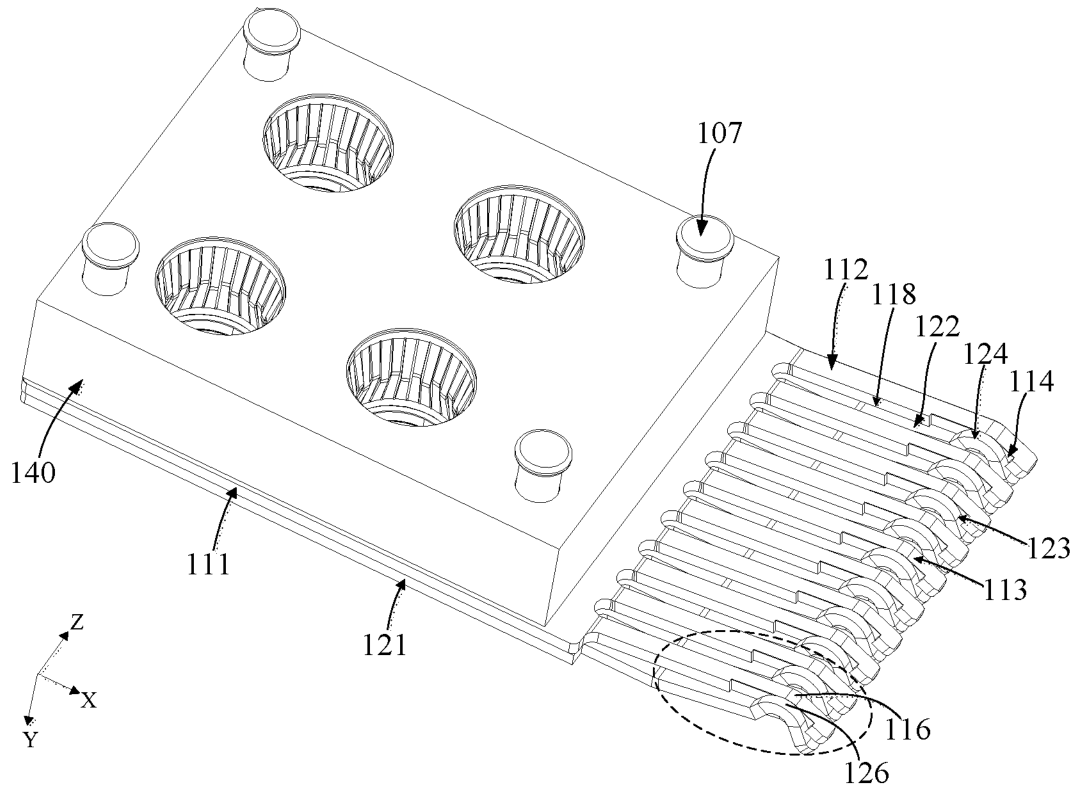
FIG. 4C is a perspective view schematically showing the structure of a part of the electrical connector according to the exemplary embodiment of the present disclosure, in which two layers of conductive terminals are assembled on a side of the support block of the electrical connector.
Figure 4D:
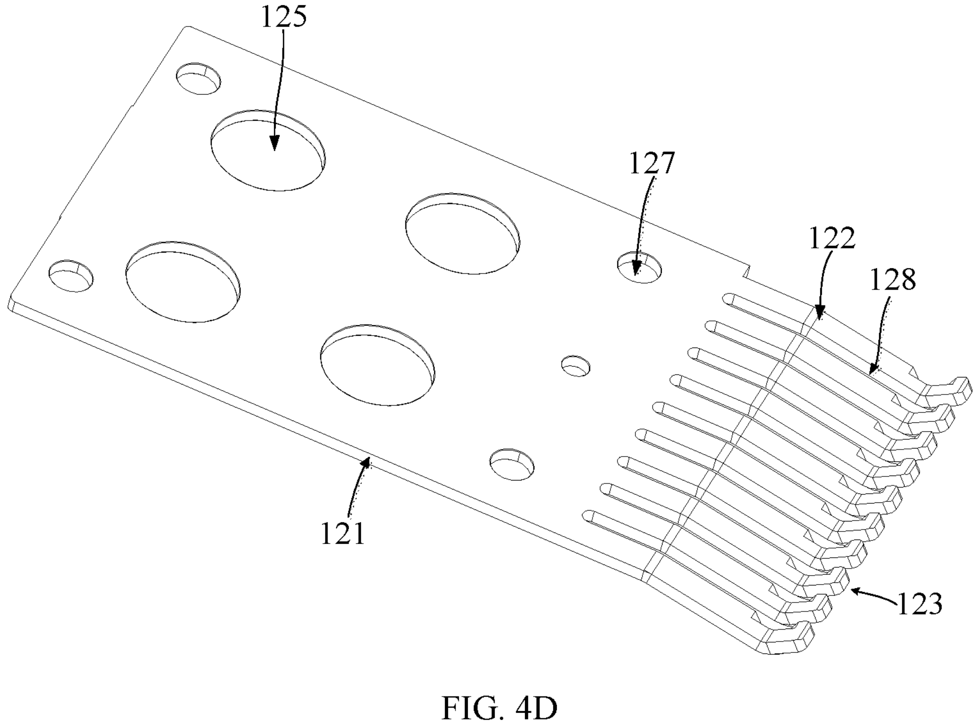
FIG. 4D is a top perspective view schematically showing the structure of a second layer of conductive terminal of the electrical connector according to the exemplary embodiment of the present disclosure.
Figure 4E:
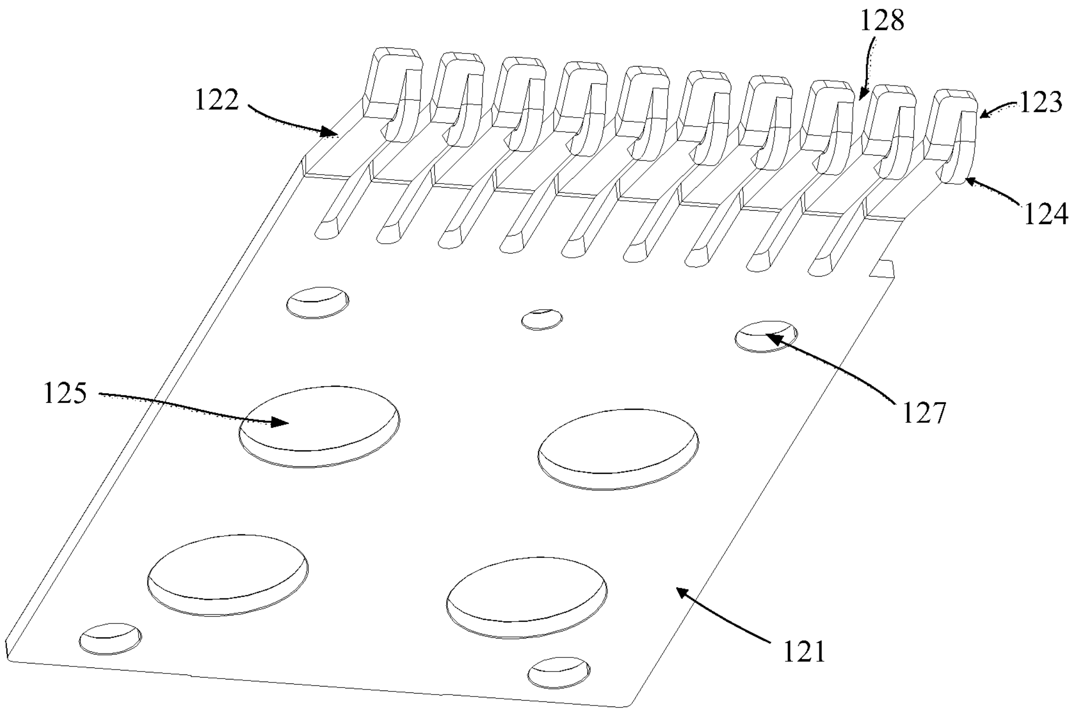
FIG. 4E is a bottom perspective view schematically showing the structure of a second layer of conductive terminal of the electrical connector according to the exemplary embodiment of the present disclosure.
Figure 4F:
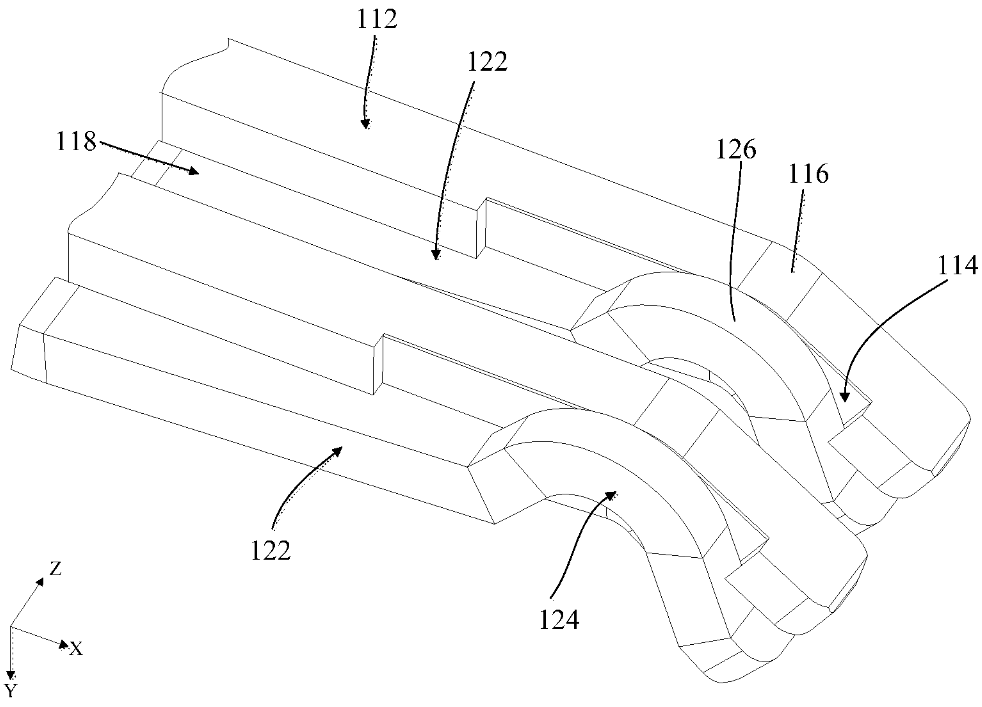
FIG. 4F is a partially enlarged view schematically showing the structure of the dotted circle portion shown in FIG. 4C.

As shown in FIG. 2, the electrical connector 100 may further include a support member 160 for elastically supporting at least respective contact ends of the conductive terminal assembly, so that the contact ends can be reliably in contact with the inserted mating component. Exemplarily, the support member 160 may be fully or partially arranged between the conductive terminal assembly and an inner wall of the housing 101 in the second direction Y.

As an example, as shown in FIG. 2, the fastening assembly 150 may include a first fastener 151, such as a bolt, which is inserted through a through-hole in the housing 101, a through-hole in the support member 160, connection holes 115, 125 and 135 formed in the respective terminal bodies, and a through-hole in the support block 140, to fix the support member and the conductive terminal assembly with respect to the support block 140. The gap between the contact ends of two conductive terminal assemblies opposite to each other in the second direction allows a mating component to be inserted therein.

Figure 6:
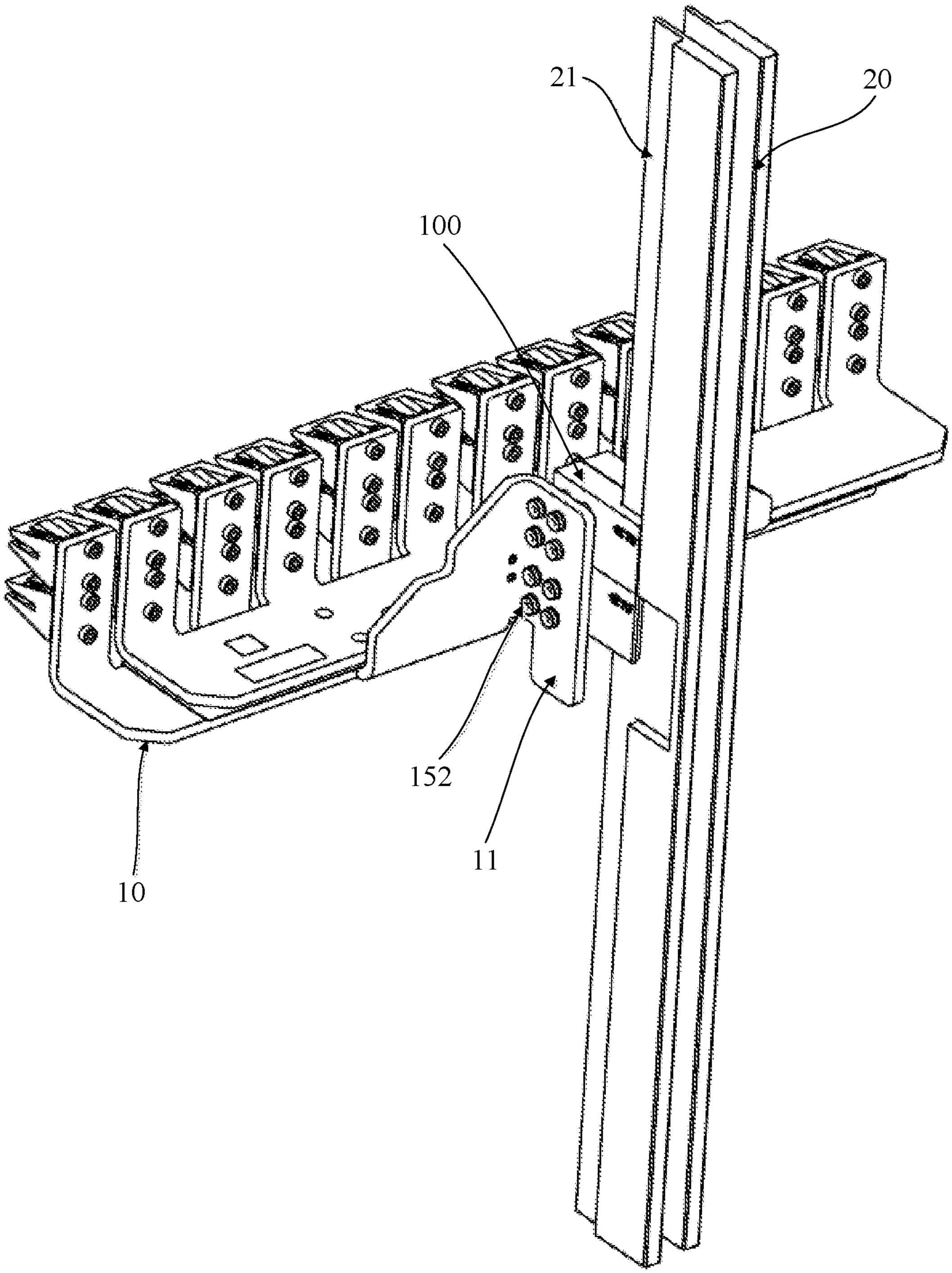
FIG. 6 is a schematic view showing a state in which the electrical connector according to the exemplary embodiment of the present disclosure is connected with a horizontal bus-bar and a vertical bus-bar.

The electrical connector 100 provided according to the exemplary embodiments of the present disclosure can be used for a variety of purposes, for example, used as a socket connector, or used as a bus or bus-bar connector to connect the horizontal bus-bar 10 and the vertical bus-bar 20, as shown in FIG. 6. The horizontal bus-bar 10 has a connection portion 11, and the vertical bus-bar 20 has a connection portion 21. The connection portion of one of the horizontal bus-bar and the vertical bus-bar is adapted to be inserted into the slot 102 of the electrical connector 100 to be electrically connected with the conductive terminal assembly. As shown in FIG. 6, a connection portion 21 of the vertical bus-bar 20 is at least partially inserted into the slot 102 of the electrical connector 100. In some examples, the connection portion 21 of the vertical bus-bar 20 may operably slide in the slot 102 in the vertical direction or the third direction Z, so as to better adapt to different installation environments. As shown in FIG. 2, the fastening assembly 150 may further include a second fastener 152, such as a screw, which may connect a connection portion 11 of the horizontal bus-bar 10 to the first fastener 151. The first fastener 151 and the second fastener 152 are conductive components, so as to electrically connect the horizontal bus-bar 10 to the conductive terminal 120 and then to the vertical bus-bar. In addition, the support block 140 may also be a conductive component, such as a copper block, that contacts the terminal body 121, so as to provide a more reliable electrical connection between the first fastener 151 and the conductive terminal assembly. As shown in FIG. 2, the fastening assembly 150 may further include a conductive spring 153, which may be positioned in the through-hole of the conductive support block 140 to provide a more reliable electrical connection between the first fastener 151 and the conductive support block 140.

Although the embodiments of the present disclosure have been shown and described, it will be understood for those skilled in the art that these embodiments can be changed without departing from the principles and spirits of the present disclosure, and the protection scope of the present disclosure is limited by the appended claims and the equivalents thereof. In addition, it should be noted that the words such as "comprise", "include" and "have" used herein do not exclude other elements or steps, unless otherwise specified.

In addition, any element symbol in the claims should not be interpreted as limiting the protection scope of the present disclosure.

What is claimed is:

1. A conductive terminal assembly, comprising:
at least three layers of conductive terminals, each layer of conductive terminals having a terminal body, one or more elastic arms extending from the terminal body, and a contact end at an end of each elastic arm distal from the terminal body in a first direction, the terminal bodies of the at least three layers of conductive terminals are overlapped with each other in a second direction perpendicular to the first direction, the contact ends of the at least three layers of conductive terminals are at least partially staggered and arranged in a third direction perpendicular to the first direction and the second direction, the contact ends are capable of electrically contacting a mating component, a number of the at least three layers of conductive terminals is N, where N is a natural number greater than or equal to 3, at least two of N elastic arms arranged adjacent to each other in the third direction are at least partially overlapped with each other in the second direction.

2. The conductive terminal assembly according to claim 1, wherein each contact end has a contact portion configured to contact with the mating component, and
the contact portions of N contact ends arranged adjacent to each other in the third direction are at least partially positioned in a same contact surface.

3. The conductive terminal assembly according to claim 2, wherein the contact portions of all contact ends of the at least three layers of conductive terminals are at least partially positioned in the same contact surface.

4. The conductive terminal assembly according to claim 2, wherein the N contact ends arranged adjacent to each other in the third direction are arranged so that a total width of the N contact ends in the third direction is less than a sum of respective widths of the N contact ends in the third direction.

5. The conductive terminal assembly according to claim 4, wherein at least two of the N contact ends arranged adjacent to each other in the third direction are at least partially overlapped with each other in the second direction.

6. The conductive terminal assembly according to claim 4, wherein at least one of the N contact ends arranged adjacent to each other in the third direction has a notch or a through-hole so that a contact end adjacent thereto is positioned at least partially within the notch or the through-hole.

7. The conductive terminal assembly according to claim 2, wherein the N contact ends arranged adjacent to each other in the third direction are in contact with each other and form a contact terminal group, a gap is provided between contact terminal groups arranged adjacent to each other in the third direction.

8. The conductive terminal assembly according to claim 1, wherein the at least three layers of conductive terminals include:
a first layer of conductive terminal having a first terminal body, a plurality of first elastic arms extending from the first terminal body and spaced apart from each other, and a first contact end located at an end of each first elastic arm distal from the first terminal body in the first direction;
a second layer of conductive terminal having a second terminal body, a plurality of second elastic arms extending from the second terminal body and spaced apart from each other, and a second contact end located at an end of each second elastic arm distal from the second terminal body in the first direction; and
a third layer of conductive terminal having a third terminal body, a plurality of third elastic arms extending from the third terminal body and spaced apart from each other, and a third contact end located at an end of each third elastic arm distal from the third terminal body in the first direction, the first terminal body, the second terminal body and the third terminal body are sequentially overlapped with each other in the second direction, the plurality of first elastic arms, the plurality of second elastic arms, and the plurality of third elastic arms are arranged in a one-to-one correspondence relationship, and the first contact end, the second contact end, and the third contact end are at least partially staggered and arranged in the third direction to electrically contact the mating component.

9. The conductive terminal assembly according to claim 8, wherein the first contact end has a first contact portion and a notch on a side of the first contact portion in the third direction, and the second contact end adjacent to the first contact end has a raised portion defining a second contact portion, the raised portion is at least partially positioned within the notch so that the first contact portion and the second contact portion are at least partially positioned in a same contact surface.

10. The conductive terminal assembly according to claim 9, wherein the raised portion of each second contact end protrudes beyond a rest of the second contact end in the second direction.

11. The conductive terminal assembly according to claim 10, wherein the raised portion is formed in a substantially U-shaped contour.

12. The conductive terminal assembly according to claim 9, wherein:
a width of the first contact portion in the third direction is less than a width of the corresponding first elastic arm in the third direction; and/or
a width of the second contact portion or the raised portion in the third direction is less than a width of the corresponding second elastic arm in the third direction.

13. The conductive terminal assembly according to claim 8, wherein:
each of the first elastic arms is at least partially overlapped with the corresponding second elastic arm in the second direction; and/or
a width of the second elastic arm in the third direction is greater than a width in the third direction of the corresponding first elastic arm.

14. The conductive terminal assembly according to claim 8, wherein the first elastic arm and the second elastic arm are at least partially positioned in a gap between adjacent third elastic arms.

15. The conductive terminal assembly according to claim 14, wherein each of the third elastic arms has a recess on a side of the third contact end, and the corresponding first contact end and second contact end are at least partially positioned in the recess.

16. The conductive terminal assembly according to claim 15, wherein a width of each of the third contact ends in the third direction is less than a width in the third direction of a portion of a corresponding third elastic arm close to the third terminal body.

17. An electrical connector, comprising:
a housing; and
a conductive terminal assembly installed in the housing, the conductive terminal assembly including at least three layers of conductive terminals, each layer of conductive terminals having a terminal body, one or more elastic arms extending from the terminal body, and a contact end at an end of each elastic arm distal from the terminal body in a first direction, the terminal bodies of the at least three layers of conductive terminals are overlapped with each other in a second direction perpendicular to the first direction, the contact ends of the at least three layers of conductive terminals are at least partially staggered and arranged in a third direction perpendicular to the first direction and the second direction, the contact ends are capable of electrically contacting a mating component, a number of the at least three layers of conductive terminals is N, where N is a natural number greater than or equal to 3, at least two of N elastic arms arranged adjacent to each other in the third direction are at least partially overlapped with each other in the second direction.

18. The electrical connector according to claim 17, further comprising a support block provided in the housing, the conductive terminal assembly is detachably fixed on one of two opposite surfaces of the support block in the second direction.

19. The electrical connector according to claim 18, wherein on each of the two opposite surfaces of the support block in the second direction, one or more conductive terminal assemblies arrayed in the third direction are provided, and adjacent conductive terminal assemblies are spaced apart from each other in the second direction and the third direction.

20. A conductive terminal assembly, comprising:

at least three layers of conductive terminals, each layer of conductive terminals having a terminal body, one or more elastic arms extending from the terminal body, and a contact end at an end of each elastic arm distal from the terminal body in a first direction, the terminal bodies of the at least three layers of conductive terminals are overlapped with each other in a second direction perpendicular to the first direction, the contact ends of the at least three layers of conductive terminals are at least partially staggered and arranged in a third direction perpendicular to the first direction and the second direction, the contact ends are capable of electrically contacting a mating component, a number of the at least three layers of conductive terminals is N, where N is a natural number greater than or equal to 3, each contact end has a contact portion configured to contact with the mating component, N contact ends of the contact portions arranged adjacent to each other in the third direction are arranged so that a total width of the N contact ends in the third direction is less than a sum of respective widths of the N contact ends in the third direction.

21. A conductive terminal assembly, comprising:

at least three layers of conductive terminals, the at least three layers of conductive terminals include:

a first layer of conductive terminal having a first terminal body, a plurality of first elastic arms extending from the first terminal body and spaced apart from each other, and a first contact end located at an end of each first elastic arm distal from the first terminal body in a first direction;

a second layer of conductive terminal having a second terminal body, a plurality of second elastic arms extending from the second terminal body and spaced apart from each other, and a second contact end located at an end of each second elastic arm distal from the second terminal body in the first direction; and a third layer of conductive terminal having a third terminal body, a plurality of third elastic arms extending from the third terminal body and spaced apart from each other, and a third contact end located at an end of each third elastic arm distal from the third terminal body in the first direction, the first terminal body, the second terminal body, and the third terminal body are sequentially overlapped with each other in a second direction perpendicular to the first direction, the plurality of first elastic arms, the plurality of second elastic arms, and the plurality of third elastic arms are arranged in a one-to-one correspondence relationship, and the first contact end, the second contact end, and the third contact end are at least partially staggered and arranged in in a third direction perpendicular to the first direction and the second direction to electrically contact a mating component.

* * * * *